United States Patent [19]
Oelbermann et al.

[11] 4,295,970
[45] Oct. 20, 1981

[54] FILTER CONVEYING DEVICE FOR FILTER PRESSES

[75] Inventors: Max Oelbermann, Remscheid; Karl-August Rademacher, Wuppertal, both of Fed. Rep. of Germany

[73] Assignee: Rittershaus & Blecher GmbH, Wuppertal, Fed. Rep. of Germany

[21] Appl. No.: 157,154

[22] Filed: Jun. 6, 1980

[30] Foreign Application Priority Data

Jun. 13, 1979 [DE] Fed. Rep. of Germany ....... 2923864

[51] Int. Cl.³ .............................................. B01D 25/00
[52] U.S. Cl. .................................................. 210/230
[58] Field of Search ................................ 210/225, 230

[56] References Cited
U.S. PATENT DOCUMENTS

| 3,306,455 | 2/1967 | Tismer | 210/230 |
| 3,878,102 | 4/1975 | Busse et al. | 210/230 |
| 4,132,647 | 1/1979 | Sakuma | 210/230 |
| 4,179,377 | 12/1979 | Schotten et al. | 210/230 |
| 4,197,203 | 4/1980 | Wilms | 210/230 |

Primary Examiner—Theodore A. Granger
Attorney, Agent, or Firm—Craig and Antonelli

[57] ABSTRACT

A conveyor device for pulling apart or conveying filter plates of a filter press. The conveyor device includes a carriage that is adapted to be moved along above the filter plates. The carriage is provided with a pawl and a drop lever that successively engage and transport filter plates, with the carriage passing from one end of the filter press to the other end of the filter press during one work cycle. The carriage automatically returns to a starting position at the other end of the filter press after a completion of the work cycle and, for this purpose, run-up ramps are provided at the ends of the filter press, with one of the run-up ramps being adapted to swing the pawl and drop lever into an opposite stop position so as to enable the elements to travel above the plates without contact. The other run-up ramp at the other end of the filter press again releases the pawl and drop lever and brings them back into a ready setting for a subsequent new work cycle.

15 Claims, 9 Drawing Figures

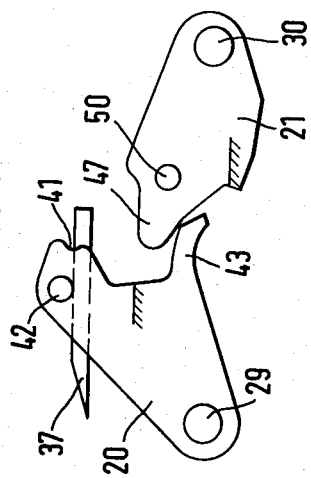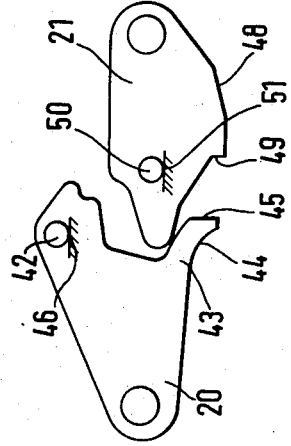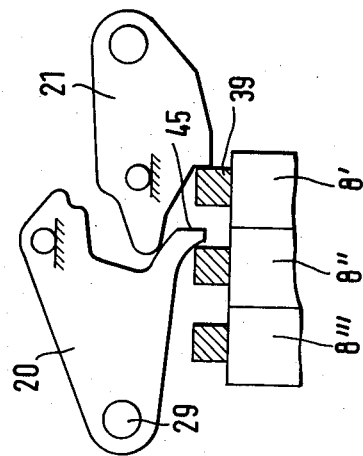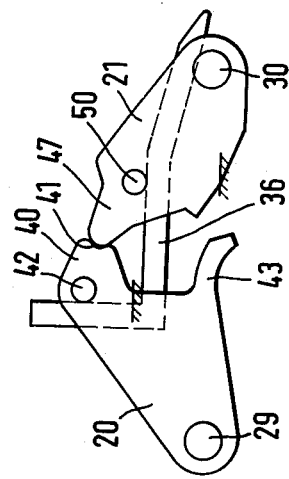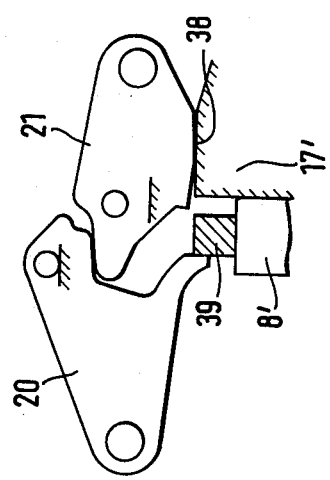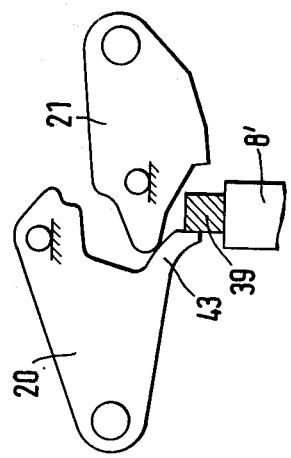

FILTER CONVEYING DEVICE FOR FILTER PRESSES

The present invention relates to an advancing or conveying device and, more particularly, to a conveyor device for filter presses which is adapted to convey or push away respective front or foremost filter plates of a pack of filter plates suspended upon upper guide rails, with the device including a carriage movable along guide rails, which carriage has a pawl mounted thereon adapted to lock behind the foremost or front filter plate in a backward movement of the carriage, and a drop lever which is adapted to run against the foremost filter plate in a backward or rearward movement of the carriage, and with a drive for the carriage that automatically reverses a direction of movement when a specific movement resistance is exceeded.

In British Pat. No. 1,234,787, a device for automatically pushing away of filter plates is proposed wherein there are two rocker arms carried on a carriage that, independently of an opening direction of the filter plate pack, selectively and respectively undertake the function of a locking pawl or a running up drop lever. Supplementary control levers are swingably or pivotably borne on bearing places of the rocker arms and on a frame of the carriage. Pins, adapted to be pushed, are provided on the rocker arms and cooperate with the control levers whereby the functions of the pushing device may be set. After a completion of a conveying or pushing process, that is, after an opening of the filter press pack, several pins on the device have to be pushed so that the device may be moved from the rear end of the filter press above the filter plates to the forward end of the press without engaging the plates. A disadvantage of this proposed construction resides in the fact that the travel process or route of the carriage must be monitored and manually controlled in order to undertake the necessary change of function of the conveying device at the proper time.

The aim underlying the present invention essentially resides in providing a filter plate conveyor device which not only automatically effects an opening of a filter plate pack but also, after the filter plate pack is opened, automatically returns to a basic position and automatically resumes a waiting position from which, by a simple starting signal, it can then execute a new filter opening process.

In accordance with advantageous features of the present invention, a drop lever is provided which has a stop tip which extends below a projection of a pawl having a stop seat. A run-up ramp is associated with the drop lever on a rear end of the filter press so as to swing the drop lever in an upward direction. A further run-up ramp is provided on a forward end of the filter press and is adapted to swing the pawl upward into a release position for the drop lever.

In accordance with the present invention, a carriage is provided on which is mounted only two movable control members, namely, the pawl and drop lever which, by virtue of an interaction with stationary run-up ramps on the filter press, automatically effect all the control actions. During a filtering process, the conveyor device is in a waiting position at a forward end of the filter press. To open the filter press, a drive means is switched on so that the conveyor device moves out of its waiting position and immediately with an opening of the filter plate pack can begin an injection of the filter plate. Advantageously the drive means may include a motor adapted to drive a cable connected to the conveyor device. When all of the filter plates of the filter plate pack have been moved, the conveyor device travels on the run-up ramp at the rear end of the filter press where the pawl and drop levers swing up and bear on each other in a high or upper position in such a way that the conveyor device may be moved back above the filter plate pack without coming into engagement with the filter plates. Thereby, the pawl runs up on the ramp of the forward end of the filter press, swings up, and releases the drop lever so that the device is ready with its pawl and lever for a new traveling operation. When the waiting or ready position is reached, the cable drive is cutoff by, for example, an end switch operatively connected with the drive motor. Aside from switching on the filter press to start an opening process, the operator of the press has nothing further to do.

In accordance with further advantageous features of the present invention, the pawl and the drop lever are swingably or pivotably carried between two vertical bearing walls of the carriage and, by virtue of lateral control pins, penetrate through recesses provided in the vertical bearing or supporting walls whereby ends of the control pins are directed toward ends of the stationary run-up ramps of the filter press. By virtue of these features, a construction is provided which is not only sturdy but is also not susceptible to external disturbances.

In accordance with still further features of the present invention, on a side facing the drop lever, the pawl may be bifurcated or fork-shaped so as to receive the stop tip of the drop lever. The pawl may be provided with a projection having disposed thereat a stop seat and a lock tip disposed below the stop seat, as well as be provided with control pins in a region of the projection.

Advantageously, in accordance with further features of the present invention, the drop lever is provided on an underside thereof with a control surface that cooperates with the filter plates, which surface has a thickness which is about equal to the thickness of a filter plate. A vertical stop surface adjoins the control surface of the drop lever on a side of the drop lever facing toward the pawl. The geometric configurations of the pawl and drop lever are so related that all functions of the conveying device may be unsusceptible to any external disturbances.

Accordingly, it is an object of the present invention to provide a conveyor device for filter plates of a filter press which avoids, by simple means, shortcomings and disadvantages encountered in the prior art.

Another object of the present invention resides in providing a conveyor device for filter plates of a filter press which is composed of only a few moving parts.

Another object of the present invention resides in providing a conveying device for filter plates of a filter press which automatically effects an opening of a filter plate pack, automatically returns to a basic starting position, and automatically resumes a waiting position so as to execute a new filter opening process.

A further object of the present invention resides in providing a conveyor device for filter plates of a filter press which is simple in construction and therefore relatively inexpensive to manufacture.

Yet another object of the present invention resides in providing a conveyor device for filter plates of a filter press which functions reliably under all operating conditions.

A still further object of the present invention resides in providing a conveyor device for filter plates of a filter press which minimizes operator intervention.

A still further object of the present invention resides in providing a conveyor device for filter plates of a filter press which is sturdy and not susceptible to external disturbances.

These and other objects, features, and advantages of the present invention will become more apparent from the following description when taken in connection with the accompanying drawings which show, for the purposes of illustration only, one embodiment in accordance with the present invention, and wherein:

FIGS. 4–9 are partial schematic detailed views illustrating a pawl and drop lever of the plate conveyor device of the present invention in various work phases.

Figure 1:
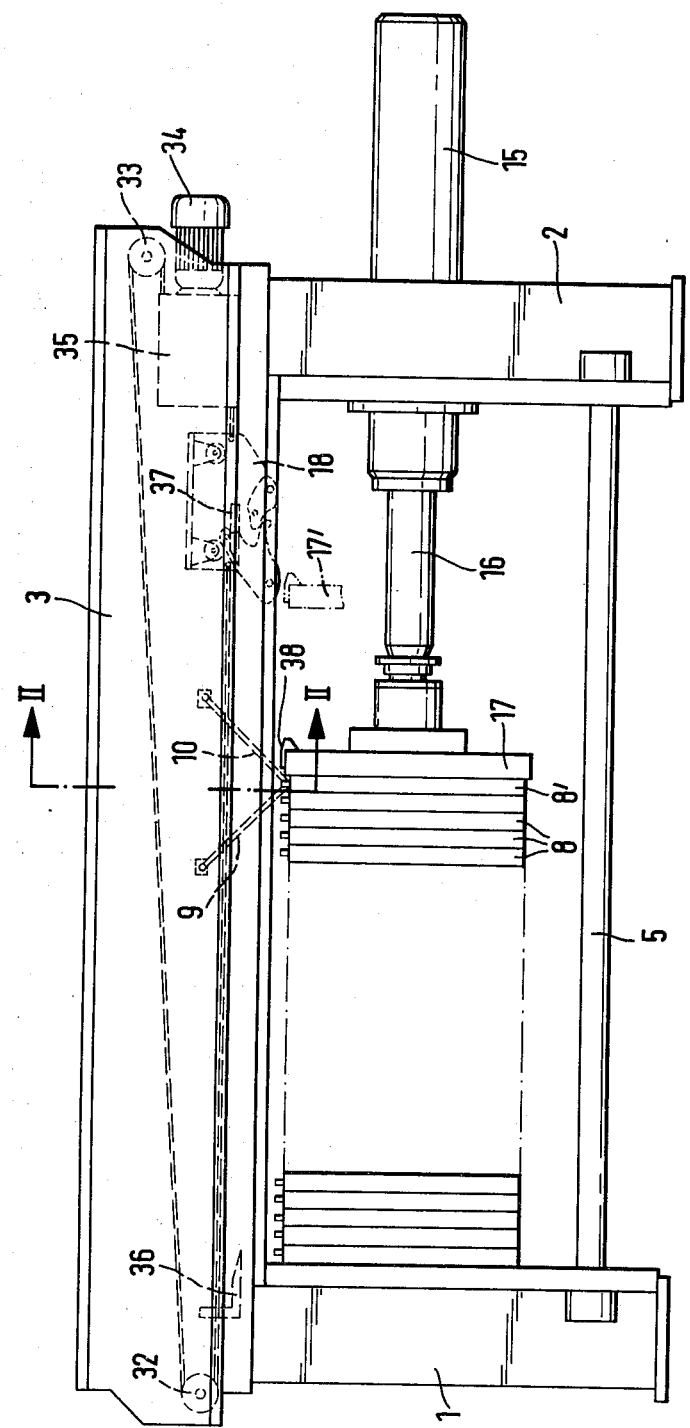
FIG. 1 is a side view of a filter press equipped with a conveying device in accordance with the present invention.
Figure 2:
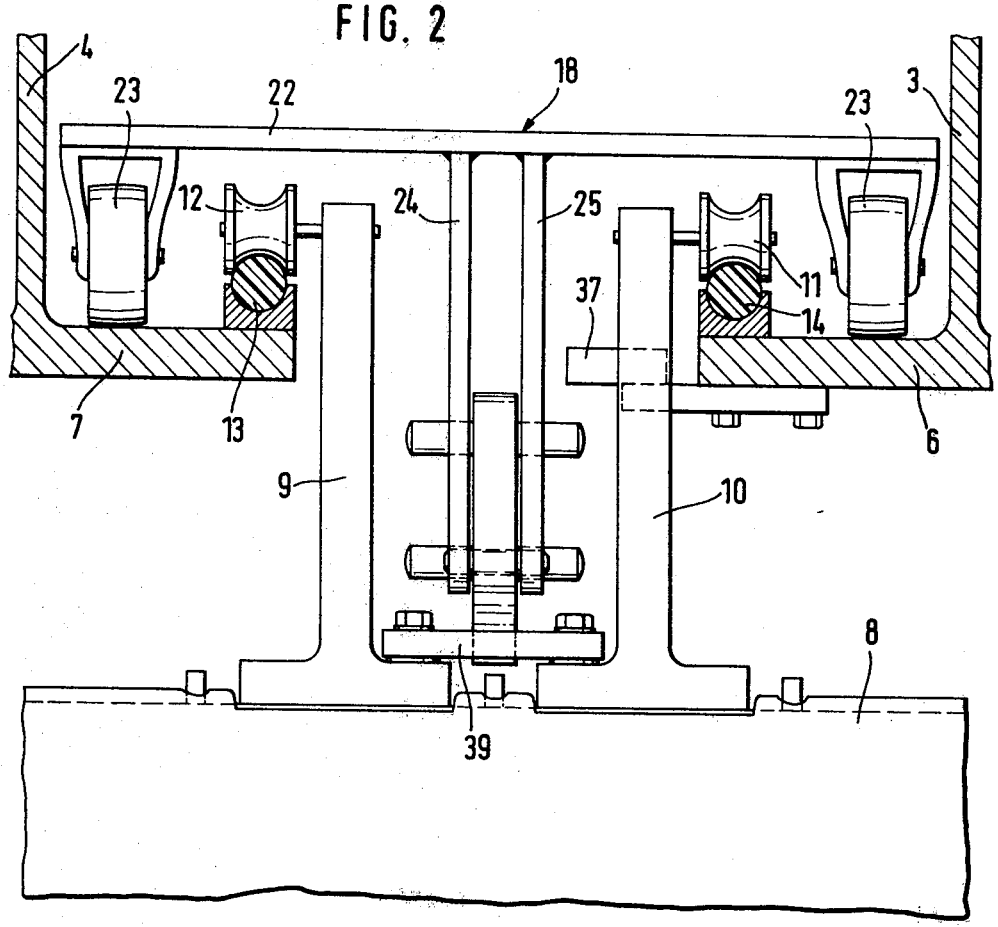
FIG. 2 is a cross sectional view taken along the line II—II of FIG. 1.

Referring now to the drawings wherein like reference numerals are used throughout the various views to designate like parts and, more particularly, to FIGS. 1 and 2, according to these Figures, a plate filter press includes two vertical uprights 1, 2 having two spaced parallel I-beams or guide supports 3, 4 mounted thereon with base areas of the vertical uprights 1,2 being joined to each other by two spaced parallel tension beams 5.

As shown most clearly in FIG. 2, the two I-beams or guide supports 3, 4 are provided with lower inner bearing flanges 6, 7. A plurality of displaceably suspended filter plates are disposed on the flanges 6, 7 by a central suspension device. The central suspension device includes supporting arms 9, 10 bent down in opposite directions with the suspension device being provided on upper narrow sides of the filter plates 8. Slide pieces 11, 12, adapted to run on rails 13, 14 provided on the flanges 6, 7 of the I-beam or guide supports 3, 4 are provided on free ends of the supporting arms 9, 10.

As shown in FIG. 1, a pressure cylinder 15 is carried or mounted on the forward filter press upright 2. The pressure cylinder 15 includes a piston 16 having mounted thereon a pressure piece 17. The pressure cylinder 15 is operable so as to result in a piston 16 and pressure piece 17 pushing against the filter plate pack so as to push the plate pack together and close any spacing or gap between a the respective filter plates 8 of the filter plate pack.

A device generally designated by the reference numeral 18 is provided for opening the filter plate pack. The device 18 includes a movable carriage displaceably mounted along the lower flanges 6, 7 of the I-beam or guide supports 3, 4. A pawl 20 and a drop lever 21 are swingably carried on the carriage 19. The carriage 19 includes a horizontal supporting plate 22 which is braced on the flanges 6, 7 through four box rollers 23. The box rollers 23 are constructed so that the carriage 19 can travel over the slide pieces 11, 12 and supporting arms 9, 10 of the suspension device for the filter plates 8.

Figure 3:
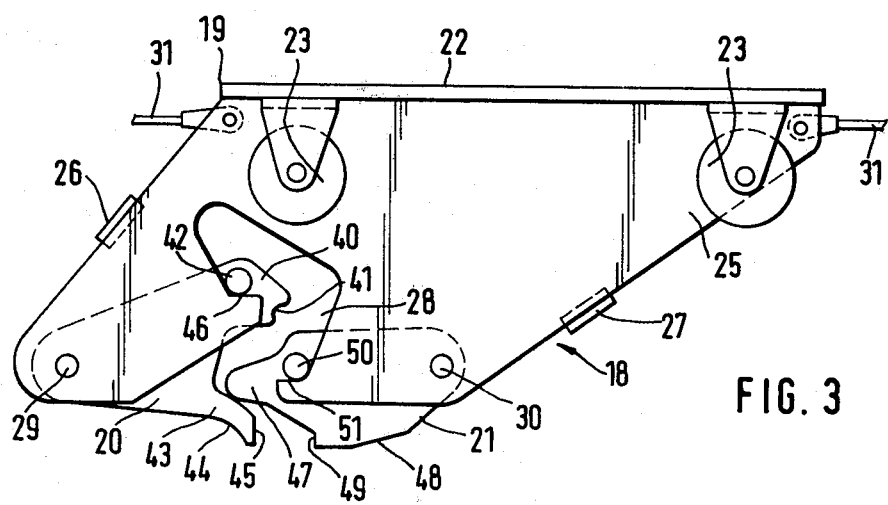
FIG. 3 is a side view of the plate conveyor device of the present invention.

Two downwardly directed vertical supporting or bearing walls 24, 25 are welded or otherwise fixedly secured to the supporting plates 22 symmetrically to a longitudinally extending mid plane of the supporting plate 22. For reasons of stability, the supporting or bearing walls 24, 25 are supplementary held together by connecting pieces 26, 27 (FIG. 3). The supporting walls 24, 25 are respectively provided with a recess 28 and are respectively connected by bearing bushings 29, 30 with the pawl 20 and the drop lever 21.

A cable 31, guided over deflector rolls 32, 33 is provided with one end of the cable 31 being secured to a drive motor arrangement 34 and the other end of the cable 31 being secured or fastened in upper corner regions between the supporting or bearing walls 24, 25. A torque monitor 35, of conventional construction, controls the running direction of the drive motor arrangement 34 and, at a rear end of the filter press, a run-up ramp 36 is provided with a further run-up ramp 37 being provided at the forward end of the filter press. The run-up ramp 37 is provided on one of the flanges 6 or 7. A ramp 38 is disposed on an upper side of the pressure piece 17 and each of the filter plates 8 is centrally provided with a post 39 which is threadably fastened to the supporting arms 9, 10 of the suspension device for the filter plates 8.

The pawl 20 is bifurcated or forked at a free end thereof which faces or is turned toward the drop lever 21. An upper projection 40 of the pawl 20 is provided with a stop seat 41. A lateral control pin 42 is carried by the upper projection 40. A lock tip 43 of the pawl 20 is disposed below the upper projection 40. The lock tip 43 of the pawl 20 is provided with a slide surface 44 and a stop surface 45.

As shown in FIG. 3, in a low position, the lateral control pin 42 of the pawl 20 is applied to surfaces 46 of recesses 28 of the respective supporting walls 24, 25. The drop lever 21, carried on the bushing 30 at the same height as the pawl 20, is provided with a stop tip 47 on a free end facing or turned toward the pawl 20. The drop lever 21 includes a control surface 48 on an underside thereof which is joined to a vertical stop surface 49 on a side of the drop lever 21 that is turned toward the pawl 20. A control pin 50 is provided on the drop lever 21 behind or rearwardly of the stop pin 47. The control pin 50 is adapted to penetrate through recesses 28 of the supporting or bearing walls 24, 25 and is applied in the low position of the drop lever on surfaces 51 of the supporting or bearing walls 24, 25.

The conveyor device of the present invention operates in the following manner:

FIG. 4 provides an illustration of the pawl 20 and drop lever 21 in a waiting or ready position. In such position, the control pin 42 of the pawl 20 has run onto the stationary run-up ramp 37 provided on the I-beam or guide support 3. In this position, the stop tip 47 of the drop lever 21 bears on an upper side of the lock tip 43 of the pawl 20.

To open the filter press, after a retraction of the piston 16 and pressure piece 17, the drive motor arrangement 34 is switched on whereafter the device 18 is moved, through the cable 31, to the left of FIG. 1 along the bearing flanges 6, 7 in a direction of the filter plate pack. As the device is displaced to the left, the carriage moves off of the run-up ramp 37. The pawl 20 slides with its slide surface 44 and the drop lever 21 with its control surface 48 over the ramp 38 provided on the head of the pressure piece 17 with the pressure piece 17 assuming the position indicated in phantom line by reference numeral 17' in FIG. 1.

After passing over the pressure piece 17, the pawl 20 with its pin 42 is applied to the surface 46 and the drop lever 21 is applied, with its control pin 50, on surfaces 51 of the supporting or bearing walls 24, 25 of the carriage 19, as shown most clearly in FIG. 5. In the approach to the foremost or front filter plate 8', the pawl 20 slides with the slide surface 44 of its lock tip 43 over the post 39 of the filter plate 8'. The pawl is thereby swung somewhat upward about its bearing 29.

As shown in FIG. 6, the perpendicular or vertical stop surface 49 of the drop lever 21 encounters a post 39 of the filter plate 8' and, upon such encounter, the carriage 19 is prevented from being displaced any further. Because of the high movement resistance that occurs when the stop surface 49 engages the post 39, the drive motor arrangement 34 is reversed through the torque monitor 35 resulting in a return of the carriage 19. In the return of the carriage 19 that now occurs, the stop surface 45 of the lock tip 43 of the pawl 20 runs on the other side against the post 39 of the filter plate 8' as shown most clearly in FIG. 7. The movement of the carriage 19 that is now toward the right is not opposed by any great resistance so that the filter plate 8' is drawn off from the filter plate pack. FIG. 6 clearly illustrates the disposition of the stop surface 45 of the lock tip 43 in the space between the first filter plate 8' and subsequent filter plate 8'' with FIG. 7 illustrating the separation of the first filter plate 8' from the pack of filter plates. When the filter plate 8' is moved by the carriage 19 to the pressure piece 17' as shown most clearly in FIG. 8, the motion or travel of the carriage 19 is stopped and thereby the motion resistance again increases resulting in the pressure monitor 35 switching the drive motor arrangement 34 into reverse again so that the carriage can once again move toward the left, whereby the drop lever 21 slides with its control surface 48 over the post 39 of the filter pack 8' and the filter plate 8'', which then becomes the foremost filter plate of the filter plate pack, can subsequently be pulled off or conveyed away.

The forward and backward travel of the carriage 19 is repeated until all the filter plates 8 have been pulled or conveyed from their position of closure and pushed toward the front end of the filter press. After the last filter plate 8 is pulled off or conveyed away, the carriage 19 again travels toward the rear end of the press; however, the movement of the carriage 19 is no longer stopped by the running-up or encountering of the vertical stop surface 49 of the drop lever 21 with a post 39 of the filter plates 8 and rather the carriage 19 travels further until the control pin 50 of the drop lever 21 runs up on the stationary ramp 36. With the drop lever 21 running up on the stationary ramp 36, the stop tip 47 engages below projection 40 of the pawl 20 and swings the pawl 20 about its bearing pin or bushing 29 until the stop tip 47 engages in seat 41 on the projection 40. The conveying device is prevented from further motion by a running or encountering of the control pin 42 against a perpendicular or vertical limb of the run-up ramp 36. The drive motor arrangement 34 is switched to reverse by the control of the torque monitor as a result of the increased resistance due to the encountering of the control pin 42 against the perpendicular limb of the run-up ramp 36 and the carriage 19 is once again moved to the right whereby the pawl and drop lever remain in the stop position shown in FIG. 9. In this position, the lock tip 43 is swung so far upwardly that the stop surface 45 can no longer come into contact with a post 39 of filter plates 8. Consequently, the conveying device is moved in an unhindered fashion over the whole length of the filter press until the control pin 42 of the pawl 20 runs up the stationary ramp 37 at the forward end of the filter press, whereby the pawl 21 is swung upward abouts its bearing or bushing 29 until the stop tip 47 of the drop lever is shaken or dropped out of the stop seat 41 on the projection 40 and the drop lever 21 swings downward until the stop tip 47 is seated on the upper side of the lock tip 43. In this position of the conveying device, the drive motor arrangement 34 may be switched off by way of a conventional end or limit switch (not shown). The pawl 20 and drop lever 21 assume the waiting or ready position shown in FIG. 4 and are ready after the next filtering process for a renewed automatic pushing or conveying away of the respective filter plates 8.

While we have shown and described only one embodiment in accordance with the present invention, it is understood that the same is not limited thereto but is susceptible of numerous changes and modifications as known to one having ordinary skill in the art, and we therefore do not wish to be limited to the details shown and described herein, but intend to cover all such modifications as are encompassed by the scope of the appended claims.

We claim:

1. A device for conveying respective filter plates from a filter plate pack of a filter press, the device including a carriage means adapted to move along the filter press, drive means for selectively moving the carriage means in a forward and reverse direction, means for automatically reversing a direction of the carriage means upon the carriage means encountering a predetermined resistance to movement, characterized in that a pawl means is swingably mounted on the carriage means for engaging behind a foremost filter plate of the filter plate pack during a movement of the carriage means in a first direction of movement, a drop lever means is swingably mounted on the carriage means for engaging a forward portion of the foremost filter plate during a movement of the carriage means in a direction opposite said first direction of movement, said pawl means and said drop lever means being configured such that when they are swung upward into a stop position out of contact with the filter plates they cooperate with one another to hold themselves in said stop position whereby they may travel past the filter plates without contacting said filter plates, and wherein means are provided at a first end of the filter press for swinging the pawl means and drop lever means into the upward stop position so as to enable the pawl means and drop lever means to travel past the filter plates without contact, and in that means are provided on an opposite end of the filter press for swinging the pawl means into a release position so as to release the drop lever means from the stop position.

2. A device according to claim 1, characterized in that the drop lever means includes a stop tip means, the pawl means includes a projection having a stop seat, said stop tip means and said stop seat being cooperable to hold the pawl means and drop lever means in the stop position.

3. A device according to claim 2, characterized in that said means for swinging the pawl means and drop lever means into an upward position includes a ramp means cooperable with the drop lever means.

4. A device according to claim 3, characterized in that said means for swinging the pawl means into a release position includes a further ramp means cooperable with said pawl means.

5. A device according to claim 4, characterized in that the carriage means includes two vertically extending supporting walls, the drop lever means is pivotably carried between said two supporting walls, laterally extending control pin means are provided on the pawl means and drop lever means for controlling a positioning of the pawl means and drop lever means during a movement of the carriage means, and in that recess means are provided in the supporting walls for limiting a lowest setting of the pawl means and drop lever means.

6. A device according to claim 5, characterized in that the control pin means on the pawl means respectively cooperate with said ramp means and said further ramp means.

7. A device according to claim 6, characterized in that the pawl means is fork-shaped on a side thereof facing the drop lever means with said projection forming one portion of the fork and a lock tip means, disposed below said projection, forming a second portion of the fork, and in that the control pin means is provided on the pawl means in an area of said projection.

8. A device according to claim 7, characterized in that a control surface is provided on an underside of the drop lever means, said control surface being adapted to cooperate with an upper side of the filter plate so as to enable the drop lever means to pass over a conveyed filter plate upon a reversing in the direction of movement of the carriage means.

9. A device according to claim 8, characterized in that a vertically extending stop surface adjoins the control surface of the drop lever means, said vertically extending stop surface being adapted to engage the forward portion of the foremost filter plate.

10. A device according to claim 9, wherein the filter press includes upper guide rails, means are provided for suspending the filter plates of the filter plate pack from the guide rails, characterized in that the carriage means is mounted for movement along the guide rails.

11. A device according to one of claims 1 or 2, characterized in that the carriage means includes two vertically extending supporting walls, the drop lever means is pivotably carried between said two supporting walls, laterally extending control pin means are provided on the pawl means and drop lever means for controlling a positioning of the pawl means and drop lever means during a movement of the carriage means, and in that recess means are provided in the supporting walls for limiting a lowest setting of the pawl means and drop lever means.

12. A device according to claim 2, characterized in that the pawl means is fork-shaped on a side thereof facing the drop lever means with said projection forming one portion of the fork and a lock tip means, disposed below said projection, forming a second portion of the fork, and in that the control pin means is provided on the pawl means in an area of said projection.

13. A device according to one of claims 1 or 2, characterized in that a control surface is provided on an underside of the drop lever means, said control surface being adapted to cooperate with an upper side of the filter plate so as to enable the drop lever means to pass over a conveyed filter plate upon a reversing in the direction of movement of the carriage means.

14. A device according to claim 13, characterized in that a vertically extending stop surface adjoins the control surface of the drop lever means, said vertically extending stop surface being adapted to engage the forward portion of the foremost filter plate.

15. A device according to one of claims 1 or 2, characterized in that the filter press includes upper guide rails, means are provided for suspending the filter plates of the filter plate pack from the guide rails, characterized in that the carriage means is mounted for movement along the guide rails.

* * * * *